(12) United States Patent
Saginaw et al.

(10) Patent No.: US 10,120,788 B2
(45) Date of Patent: Nov. 6, 2018

(54) CLOUD CONNECTED AUTOMATED TESTING IN MULTIPLE OPERATING ENVIRONMENTS USING MULTIPLE PARALLEL TEST THREADS

(71) Applicant: Accenture Global Solutions Limited, Dublin OT (IE)

(72) Inventors: Jonathan Saginaw, New York, NY (US); Austin J. Darigo, Warminster, PA (US); Alexis M. Stevens, Atlanta, GA (US); John C. Anderson, Broadlands, VA (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/412,481

(22) Filed: Jan. 23, 2017

(65) Prior Publication Data
US 2018/0210822 A1 Jul. 26, 2018

(51) Int. Cl.
*G06F 9/44* (2018.01)
*G06F 11/36* (2006.01)

(52) U.S. Cl.
CPC ...... *G06F 11/3688* (2013.01); *G06F 11/3664* (2013.01); *G06F 11/3684* (2013.01)

(58) Field of Classification Search
CPC .................................................. G06F 11/3688
USPC .................................................. 717/123–129
See application file for complete search history.

(56) References Cited

U.S. PATENT DOCUMENTS

| | | | | |
|---|---|---|---|---|
| 7,376,937 B1 * | 5/2008 | Srivastava | ............... | G06F 8/427 717/126 |
| 8,196,104 B2 * | 6/2012 | Cohrs | ................. | G06F 11/3672 717/124 |
| 8,286,143 B2 * | 10/2012 | Garimella | ........... | G06F 11/3688 717/124 |
| 8,418,000 B1 * | 4/2013 | Salame | ................. | G06F 11/079 714/26 |
| 8,468,502 B2 * | 6/2013 | Lui | ...................... | G06F 11/3636 717/125 |
| 8,539,447 B2 * | 9/2013 | Kilian | ................. | G06F 11/3604 717/124 |
| 8,572,566 B2 * | 10/2013 | Gass | ......................... | G06F 8/71 717/101 |
| 8,621,441 B2 * | 12/2013 | Landwehr | ........... | G06F 11/3604 714/38.1 |

(Continued)

OTHER PUBLICATIONS

Noor et al, "Studying Test Case Failure Prediction for Test Case Prioritization", ACM, pp. 1-10, 2017.*

(Continued)

*Primary Examiner* — Anil Khatri
(74) *Attorney, Agent, or Firm* — Brinks Gilson & Lione

(57) ABSTRACT

Cloud Connected automated testing (CCAT) provides a low-cost, high-throughput, automated multi-thread testing platform for testing application with multiple test cases in a variety of operating environments. The platform may be hosted on cloud infrastructure. Unlike other test automation platforms, inputs to CCAT are based on human readable formats, such as keyword entries in a spreadsheet. CCAT thereby reduces the need for testers to understand highly specialized and difficult to use coding languages such as Java or Python.

14 Claims, 16 Drawing Sheets

(56) References Cited

U.S. PATENT DOCUMENTS

| | | | | |
|---|---|---|---|---|
| 8,719,818 | B2* | 5/2014 | Chen | H04L 41/145 |
| | | | | 714/742 |
| 8,813,039 | B2* | 8/2014 | Maczuba | G06F 11/0778 |
| | | | | 714/25 |
| 8,819,490 | B2* | 8/2014 | Li | G06F 11/3688 |
| | | | | 714/32 |
| 8,839,035 | B1* | 9/2014 | Dimitrovich | G06F 11/3688 |
| | | | | 714/25 |
| 8,875,102 | B1 | 10/2014 | Feng | |
| 9,009,677 | B2* | 4/2015 | Zhao | G06F 11/3688 |
| | | | | 717/127 |
| 9,047,410 | B2* | 6/2015 | Markande | G06F 11/3688 |
| 9,253,159 | B2* | 2/2016 | Chauhan | H04L 63/0272 |
| 9,760,567 | B1* | 9/2017 | Ourfalian | G06F 17/289 |
| 9,785,544 | B2* | 10/2017 | Tan | G06F 11/3688 |
| 2015/0006966 | A1 | 1/2015 | Dimitrovich et al. | |
| 2015/0089299 | A1 | 3/2015 | Gittelman et al. | |

OTHER PUBLICATIONS

Yamada et al, " Greedy Combinatorial Test Case Generation using Unsatisfiable Cores", ACM, pp. 614-624, 2016.*

Regehr et al "Test-Case Reduction for C Compiler Bugs", ACM, pp. 335-345, 2012.*

Wang et al, "Automatic Generation of System Test Cases from Use Case Specifications", ACM, pp. 385-396, 2015.*

Engelen et al, "A Unified Framework for Nonlinear Dependence Testing and Symbolic Analysis", ACM, pp. 106-115, 2004.*

Castanos et al, "On the Benefits and Pitfalls of Extending a Statically Typed Language JIT Compiler for Dynamic Scripting Languages", ACM, pp. 195-212, 2012.*

Daniel et al, "Automated GUI Refactoring and Test Script Repair (Position Paper)", ACM, pp. 38-41, 2011.*

European Patent Office, Extended European Search Report in European Application No. 17207826.3 dated Jun. 18, 2018, pp. 1-9.

* cited by examiner

900

| RunMode | Action | ObjectDetails | |
|---|---|---|---|
| Yes | openURL | https://www.accenture.com/us-en/company | 908 |
| Yes | wait | 40 | 910 |
| Yes | verify | SignIn | |
| Yes | wait | 5 | |
| Yes | click | SignIn | 912 |
| Yes | wait | 20 | |
| Yes | verify | RegisterAccenture | |
| Yes | wait | 5 | |
| Yes | verify | RegisterButton | |
| Yes | wait | 5 | |
| Yes | getcoordinates | FrameSwitch | |
| Yes | wait | 5 | |
| Yes | switchiframe | 1 | |
| Yes | wait | 10 | |
| Yes | set | EmailAddress | |
| Yes | wait | 5 | |
| Yes | set | Password | |
| Yes | wait | 5 | |
| Yes | click | SignInButton | |
| Yes | wait | 10 | |
| no | switchiframe | 1 | |
| no | wait | 20 | |
| no | focus | ErrorMessageEmail4 | |
| | fontcolor | ErrorMessageEmail4 | |
| | verify | ErrorMessageEmail4 | |
| Yes | wait | 5 | |
| no | focus | ErrorMessagePassword4 | |
| Yes | switchdefault | 1 | |
| Yes | wait | 20 | |
| Yes | switchiframe | 1 | |
| Yes | wait | 20 | |
| Yes | fontcolor | ErrorMessagePassword4 | |
| Yes | verify | ErrorMessagePassword4 | |
| Yes | wait | 5 | |
| no | switchdefault | 1 | |
| no | verify | SignInDetails | |
| no | wait | 5 | |

920 brackets mark groups of "no" RunMode rows.

| RunMode | Action | ObjectDetails | ExpectedText-FF | ExpectedText-Chrom | ExpectedText-IE |
|---|---|---|---|---|---|
| Yes | openURL | https://www.accenture.com/us-en/company | About Accenture | | |
| Yes | wait | 40 | | | |
| Yes | click | MainMenu | | | |
| Yes | wait | 10 | | | |
| Yes | isavailable | SideHeader1 | | | |
| Yes | isavailable | SideHeader2 | | | |
| Yes | isavailable | SideHeader3 | | | |
| Yes | isavailable | SideHeader4 | | | |
| Yes | isavailable | SideHeader5 | | | |
| Yes | isavailable | SideHeader6 | | | |
| Yes | isavailable | SideHeader7 | | | |
| Yes | wait | 10 | | | |
| Yes | verify | SideHeader1 | STRATEGY | STRATEGY | STRATEGY-123 |
| Yes | verify | SideHeader2 | CONSULTING | CONSULTING | CONSULTING |
| Yes | verify | SideHeader3 | DIGITAL | DIGITAL | DIGITAL |
| Yes | verify | SideHeader4 | TECHNOLOGY | TECHNOLOGY | TECHNOLOGY |
| Yes | verify | SideHeader5 | OPERATIONS | OPERATIONS | OPERATIONS |
| Yes | verify | SideHeader6 | INDUSTRIES | INDUSTRIES | INDUSTRIES |
| Yes | verify | SideHeader7 | CAREERS | CAREERS | CAREERS |
| Yes | wait | 10 | | | |

CLOUD CONNECTED AUTOMATED TESTING IN MULTIPLE OPERATING ENVIRONMENTS USING MULTIPLE PARALLEL TEST THREADS

TECHNICAL FIELD

This application concerns automated testing of applications.

BACKGROUND

Explosive growth in computer hardware and software capabilities has led to implementation of sophisticated processing systems that impact nearly every aspect of day-to-day life. More recent developments have allowed these systems to take virtualized forms, and to be hosted on computing infrastructure anywhere in the world. Efficiently testing these computer hardware and software systems is a significant technical challenge.

BRIEF DESCRIPTION OF THE DRAWINGS

FIG. 9 shows an exemplary keyword-based input test script in a spreadsheet format for a test case;

FIG. 10 shows an exemplary keyword-based input test script in a spreadsheet format for a test case including expected test outputs;

DETAILED DESCRIPTION

Figure 1:
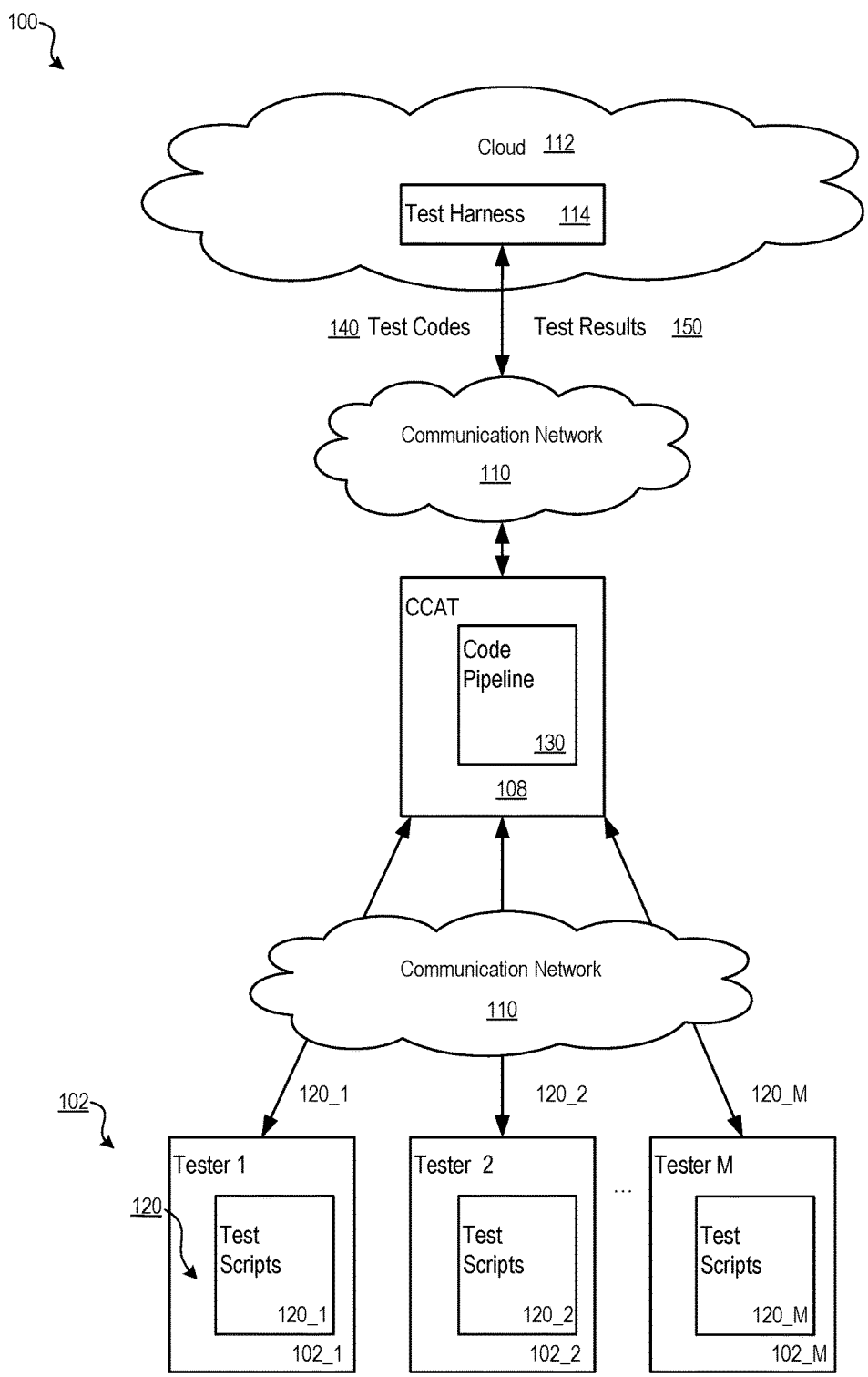
FIG. 1 shows a cloud connected automated testing system.

Successful deployment of software applications rely critically on comprehensive testing prior to their releases. An application may contain internal functions that need to be thoroughly tested using a comprehensive set of independent test cases, where each test case may be designed to verify one or more of multiple aspects or functions of the application. In addition, because an application may be developed based on layers of software stacks and libraries that may be platform dependent, testing of the application may need to be conducted in a wide variety of operating environments that may be in place at a wide variety of user locations of the application. As such, full testing of an application can become resource-intensive, error prone, and time consuming, involving running a large number of independent test cases each in multiple operating environments.

For example, an application may be a website containing a collection of related webpages that are complex from a testing standpoint. Specifically, a website may be hosted on at least one webserver but accessed and viewed by many different types of users using many different types of web browsers on many different types of user devices. A webpage may refer to what a web browser displays to a user when the webpage is accessed, or may alternatively refer to a set of files associated with the webpage and downloaded from webservers and interpreted by web browsers. These files may typically be in a HyperText Markup Language (HTML) or other comparable markup languages. An HTML file may be manually written or dynamically generated by a webserver. Each HTML file may be identified by a unique Uniform Resource Locator (URL). A webpage may be embedded with contents such as texts, animations, videos, audios, and other applications. A webpage may further include elements for user input, such as a box for inputting texts, and a radio button or a dropdown menu and the like for inputting user choices. These user inputs may be submitted to the webservers for further processing. For example, dynamic HTML files may be generated by the webserver based on these user inputs. A webpage may further contain hyperlinks (URLs) to other web pages, allowing a user to traverse between various webpages within a same website or between websites. A HTML file may encapsulate one or more non-HTML element in the form of, for example, an applet, written in languages, such as JavaScript. These embedded non-HTML elements may be executed by corresponding engines in web browsers to produce parts of the webpages displayed.

In addition to the complexity of websites and webpages as described above, each user may choose to install one or more of different web browsers on his/her device, such as Firefox, Google Chrome, Internet Explorer/Microsoft Edge, Opera, and Safari. Each of these web browsers may further run in different operating systems (potentially virtualized), including but not limited to various versions of Microsoft Windows, Apple Operating System, and Linux-based operating systems. In addition, these web browsers may include different sets of capabilities for user devices of varying physical forms (mobile phones, tablets, personal computers, etc.) and display characteristics. The combination of types of browsers, the operating systems in which the browsers run, and the physical forms of user devices gives rise to a large possible number of operating environments that need to be tested for websites and webpages.

The disclosure below provides methods, apparatus, and systems for carrying out multiple test cases for complex applications in multiple operating environments using multiple parallel test threads running in a cloud. Specific implementations for testing websites and webpages are described as examples without losing general applicability of this disclosure to various other application testing contexts.

FIG. 1 shows an exemplary system 100 for implementing automated testing of websites or webpages (generally referred to as webpages below) in cloud. System 100 includes Cloud Connected Automated Testing (CCAT) servers 108 for processing test tasks from testers (referred to alternatively as clients) 102 including 102_1, 102_2, and 102_M and implementing processed test tasks in a test harness 114 in cloud 112. The CCAT servers 108 may be centralized at a single location or distributed over multiple geographic locations. Clients 102 may communicate with the CCAT servers 108 via communication network 110. Similarly, the CCAT servers 108 may communicate with the test harness 114 via the communication network 110. The communication network 110 may be based on, for example, the Internet Protocol (IP), and may include a combination of wired or wireless access networks, local area networks, wide area networks, and other computer networks.

A tester may be a remote terminal device from which tests can be submitted for automatic execution by the CCAT servers. Tests may be submitted by a QA (Quality Assurance) personnel of the providers of the websites to be tested remotely via any tester. A tester may be alternatively referred to as a tester device and may be any suitable electronic devices including but not limited to mobile phones, tablets, laptop computers, personal computers, and Personal Digital Assistants (PDAs). A QA personnel may be separate from the developers and programmers of the website. In the particular implementations of webpage testing based on system 100 as described below, a QA need not to be technically sophisticated as to coding of webpages. Further, the CCAT servers 108 may be accessed from testers remotely and from anywhere. For example, the CCAT servers may include webservers hosting websites. As such, testers 102 may contain web browsers for communicating with the CCAT servers and submit test tasks by remotely accessing webpages hosted by the CCAT webservers from any location of the testers. Alternatively, testers 102 may be installed with dedicated tester software locally on tester devices for remotely accessing the CCAT servers. In system 100, the cloud 114 and the CCAT servers 108 may be operated by separate and independent service providers.

Test steps and test data associated with the test cases that are submitted from the testers may be specified as test scrips 120, such as 120_1, 120_2, and 120_M, in a predefined format. The CCAT servers 108 receive these formatted test scripts and process them into test codes 140 via a code pipeline 130, exemplary implementations of which will be described in more detail below. The processed test codes 140 may be sent to the cloud and executed by the test harness 114. Test results 150 may then be communicated back to testers 120 via the CCAT servers.

Figure 2:
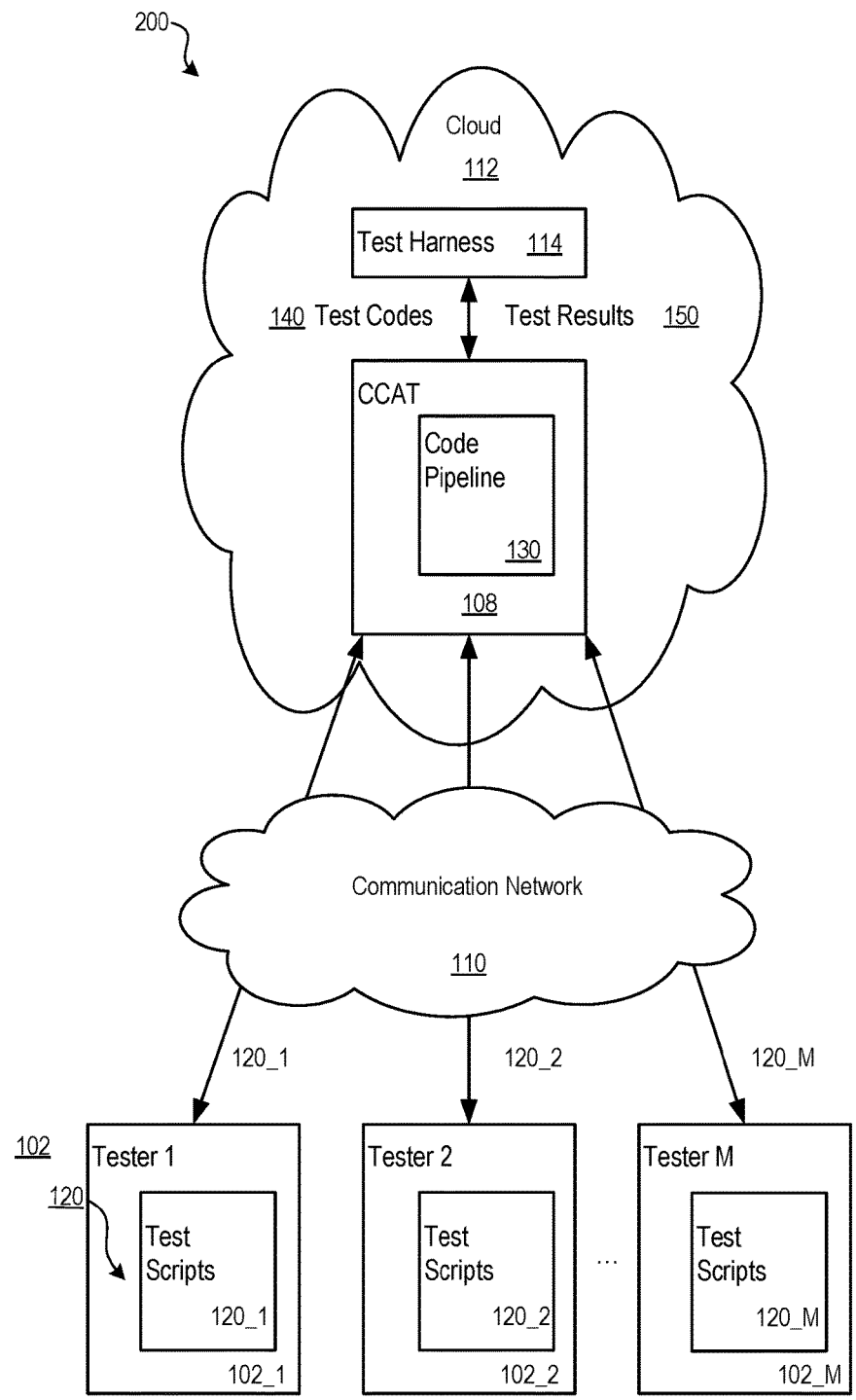
FIG. 2 shows an alternative cloud connected automated testing system.

FIG. 2 shows an alternative system 200 for implementing cloud connected automated testing of webpages. System 200 is similar to system 100 except that the functions of the CCAT servers may be implemented in the cloud. As such, a CCAT service provider may not need to maintain and operate its own servers. Rather, a CCAT service provider may exploit hardware and/or platforms in the cloud 112 from one or more cloud service providers for implementing CCAT functions, including the code pipeline 130.

In another alternative system to the system 200 of FIGS. 1 and 2, test scripts 120_1, 102_2, and 102_M may be stored in a depository in the cloud 112. The remote tester devices 102 may be used to submit the test scripts into the cloud depository. The remote tester devices 102 may be further used to communicate instructions to initiate an automatic process for a test or a group of tests stored in the cloud depository, via, for example, a web browser accessing the CCAT web server.

Figure 3:
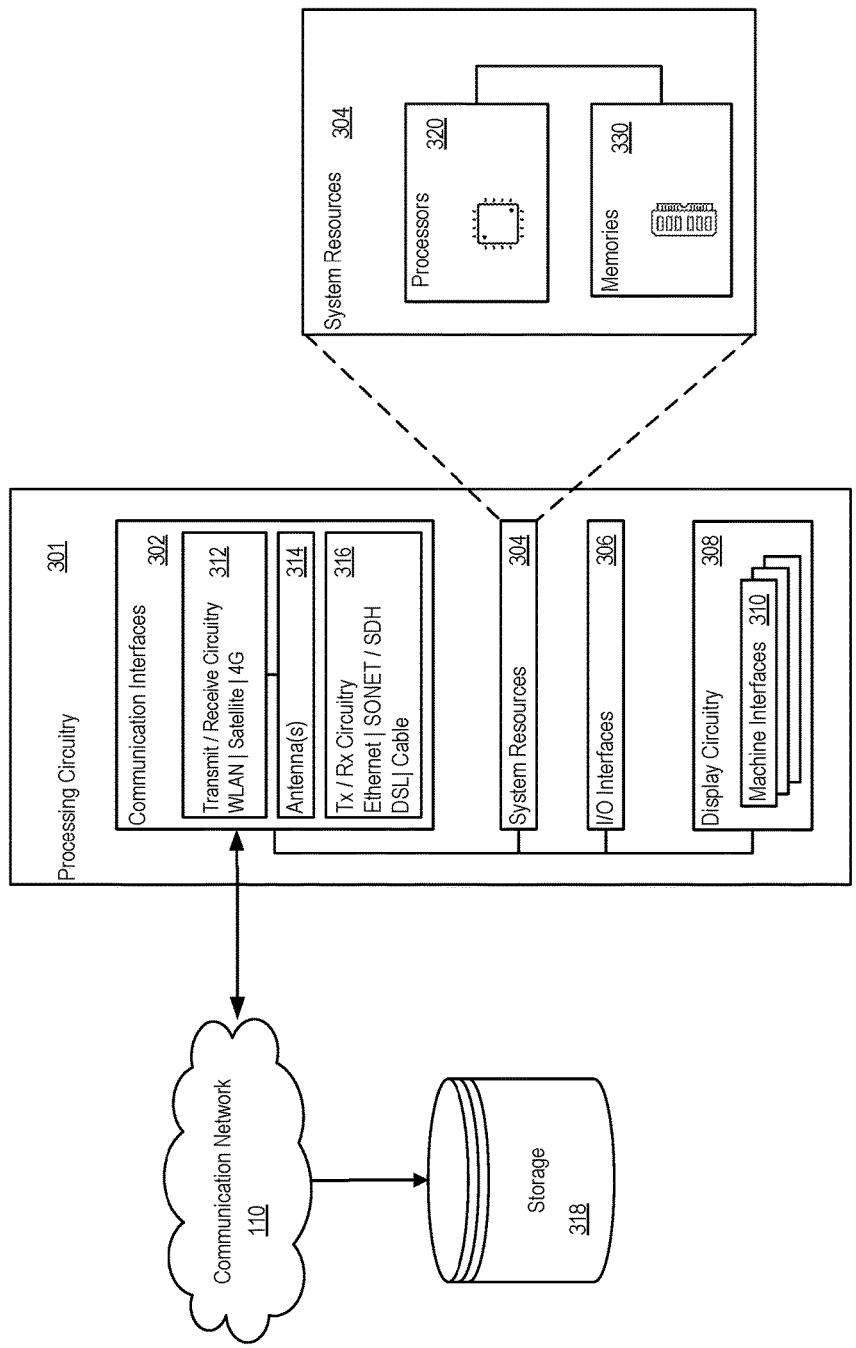
FIG. 3 shows exemplary processing circuitry that may be used in an cloud connected automated testing system.

The servers, including the CCAT servers, webservers, and servers configured in the cloud, and tester devices may each be implemented as processing circuitry 301, e.g., as shown in FIG. 3. The processing circuitry 301 may include communication interfaces 302, system resources 304, input/output (I/O) interfaces 306, and display circuitry 308 that generates machine interfaces 310 locally or for remote displays. The machine interfaces 310 and the I/O interfaces 306 may include GUIs, touch sensitive displays, voice or facial recognition inputs, buttons, switches, speakers and other user interface elements. The I/O interfaces 306 may further include magnetic or optical media interfaces (e.g., a CDROM or DVD drive), serial and parallel bus interfaces, and keyboard and mouse interfaces.

The communication interfaces 302 may include wireless transmitters and receivers ("transceivers") 312 and any antennas 314 used by the transmit/receive circuitry of the transceivers 312. The transceivers 312 and antennas 314 may support Wi-Fi network communications, for instance, under any version of IEEE 802.11, e.g., 802.11n or 802.11ac. The communication interfaces 302 may also include wireline transceivers 316. The wireline transceivers 316 may provide physical layer interfaces for any of a wide range of communication protocols, such as any type of Ethernet, data over cable service interface specification (DOCSIS), digital subscriber line (DSL), synchronous optical network (SONET), or other protocol.

Processing circuitry 301 may be in communication with testers 102 via the communication network 110. Processing circuitry 301 may further be in communication with storage 318, either directly or via the communication network 110. The storage 318 may comprise any type of storage media, including but not limited to magnetic or optical disks, solid state media, and magnetic tapes. The storage 318 may be centralized or alternatively organized as a distributed storage network.

As shown in FIG. 3, the system resources 304 of the processing circuitry 301 may include hardware, software, firmware, or other circuitry and resources in any combination. The system resources 304, for example, may include instruction processors 320. The system resources 304 may further include memories 330. The system resources 304 may be implemented, for example, as one or more systems on a chip (SoC), application specific integrated circuits (ASIC), microprocessors, in combination with solid state memories, random access memories, discrete analog and digital circuits, and other circuitry. The system resources 304 provide the basic platform for implementation of any desired functionality in the processing circuitry 301. The memories 330 store, for example, instructions that the processors 320 may execute to carry out desired functionality of a CCAT server, a test harness server, or a tester device.

Figure 4A:
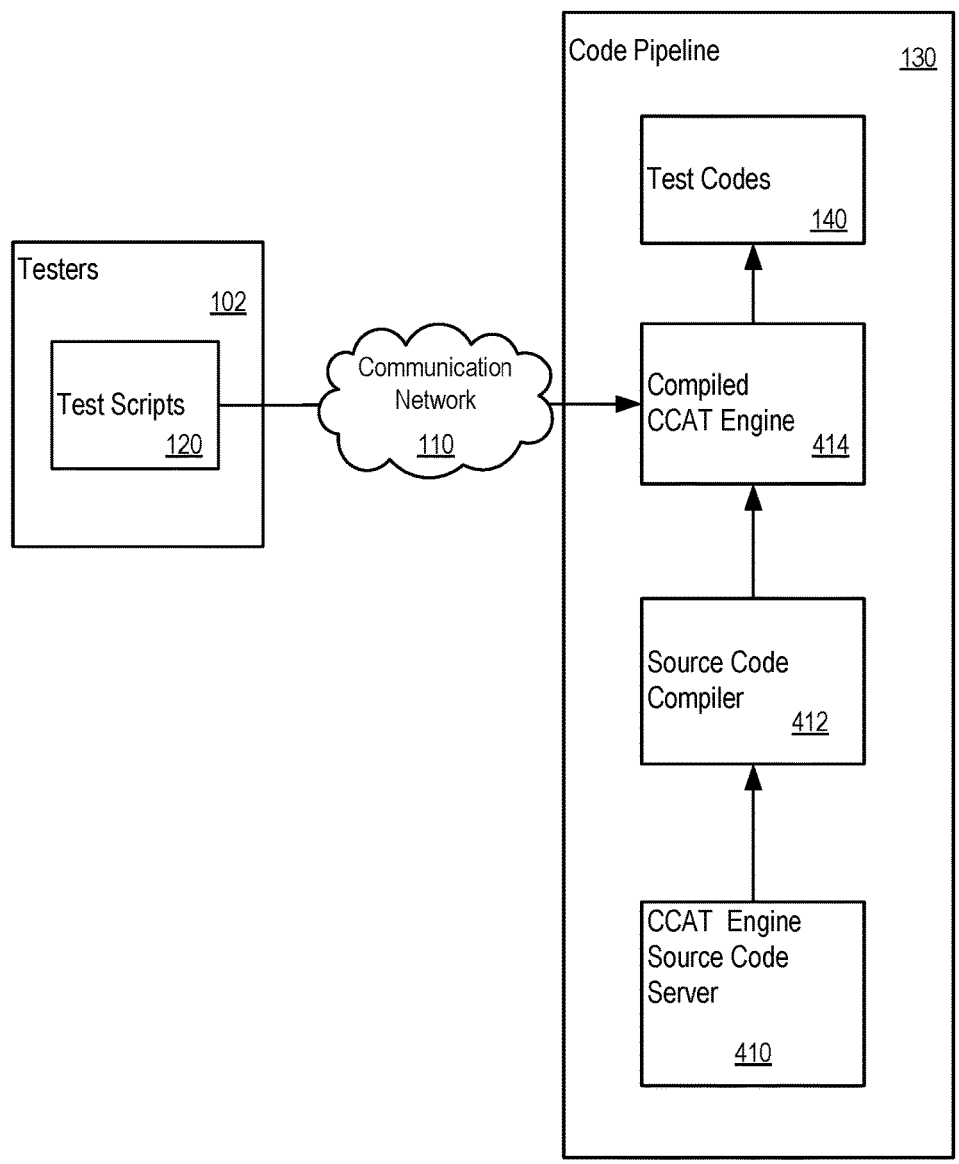
FIGS. 4A and 4B illustrate exemplary logical flow diagrams for a code pipeline of the cloud connected automated testing system.

FIG. 4A illustrates an exemplary code pipeline 130 of CCAT servers 108. In particular, the CCAT servers run a CCAT engine 414 for transcoding, for example, test scripts 120 submitted by testers 102, into test codes 140. The CCAT engine 414 may be updated and recompiled as frequently as needed. For example, the CCAT engine 414 may be compiled and regenerated in real time every time every test scripts are submitted. The source code for the CCAT engine may be stored in a source code server 410. A source code compiler 412 may be used for compiling the CCAT source code that may be modified or updated at any time. The compiled CCAT engine takes the test scripts 120 from testers 102 as input via the communication network 110 and transcodes the test script into test codes 140 that may be interpreted and executed by the cloud-based test harness 114 of FIG. 1 or FIG. 2. As an example, the cloud-based test harness may be a test grid configured in the cloud and containing test hubs and test nodes, such as a Selenium™ grid.

Figure 4B:
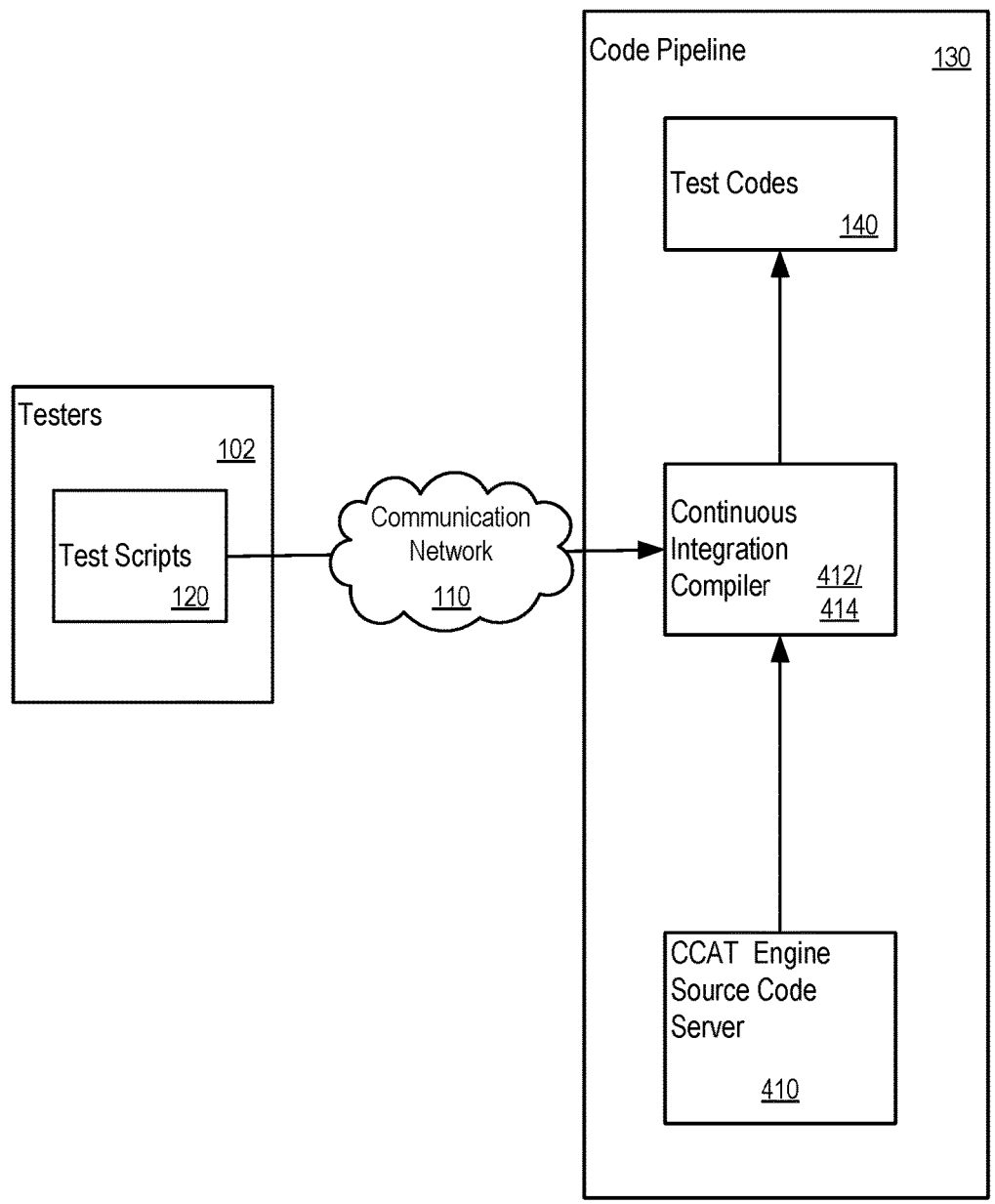

FIG. 4B illustrates an alternate implementation of the code pipeline 130. In the code pipeline of 130 of FIG. 4B, the CCAT engine 414 and the source code compiler 412 may be combined into a continuous integration compiler 412/414 that processes the source code of the CCAT engine and the input test scripts 120 from the tester 102 into the test codes 140 in a single step. As such, the continuously updated CCAT engine source codes may be utilized every time a test is submitted by the tester.

Figure 5:
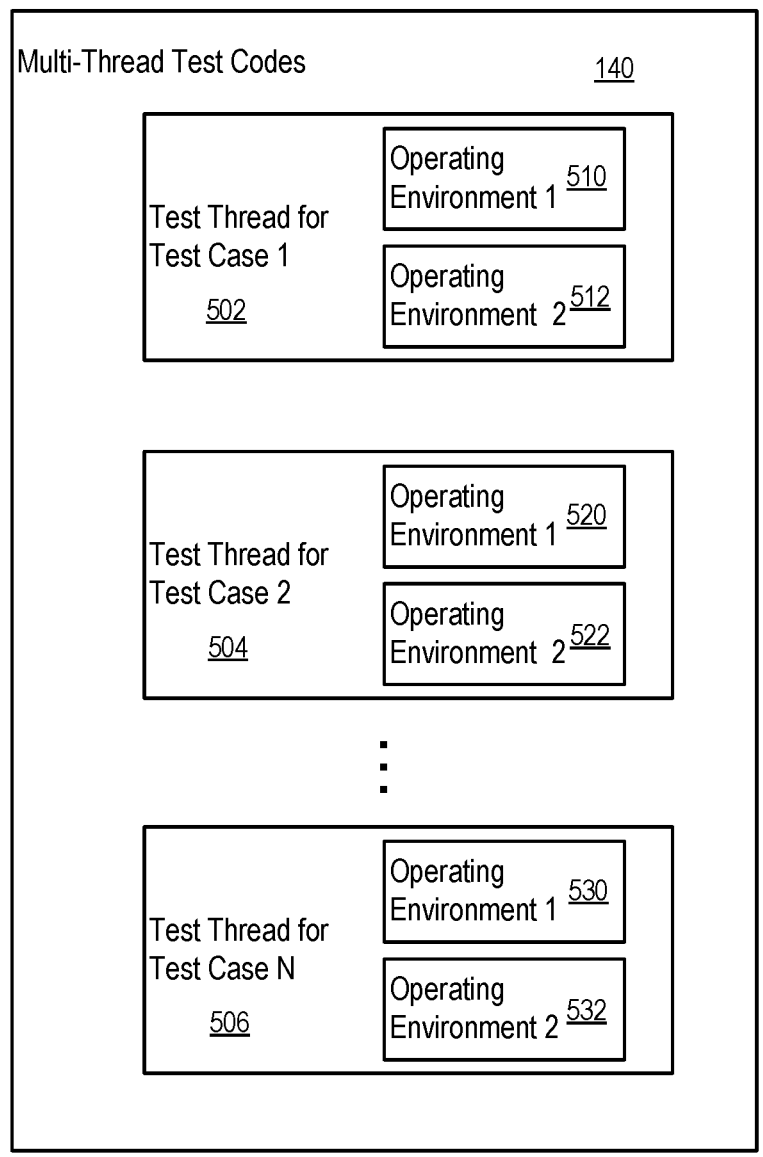
FIG. 5 illustrates a multi-thread implementation of performing multiple test cases in multiple operating environments.

The code pipeline 130 may be specifically configured to transcode test scripts 120 into test codes 140 of multiple test cases each to be run as an independent thread by the test harness 114. Furthermore, the code pipeline may generate the test codes 140 such that each test case may be run in parallel for different operating environments. For example, as shown in FIG. 5, the test script 120 may be transcoded to run as multiple test threads 502, 504, and 506, each corresponding to an independent test case of N test cases. Test cases are independent, when, for example, they have no data dependence, i.e., running of one test case does not depend on the status or output of any other test cases. Each test case, including its test steps and test data specified in the test scripts 120, may run in both operating environment 1 and operating environment 2, shown by 510, 520, 530, and 512, 522, 532, respectively. For simplicity of description, two non-limiting operating environments are referred to here. As discussed above, many operating environments as combinations of different versions of web browsers, operating systems, and user devices may need to be tested.

Alternatively to what was described above with regard to FIG. 5, test code 140 may be generated by the code pipeline such that each test case in each operating environment may be run as an independent thread by the test harness 114. This is shown by 610, 612, 620, 622, 630, and 632 in FIG. 6. Specifically, rather than running the test as N threads in FIG. 5 each for one of the N test cases, the test may be run as N×K independent threads, where K denotes the number of operating environments being tested.

Test codes generated by the code pipeline 130 may instantiate test instances via a testing grid, such as a Selenium™ grid. The test codes thus may contain a collection of test steps and test data formatted to invoking test objects in the testing grid, such as Selenium™ remote web driver objects. A testing grid includes a test hub, and one or more test nodes pre-created in the cloud 112. Each of the test hub and test nodes may be identified by an IP address and/or a port number, for instance. Corresponding to FIG. 5, a test thread for each test case may be independently instantiated to create test objects in testing grid web drivers each for one of the multiple operating environments. For example, for test thread 502 (for test case 1) in FIG. 5, the operating environment 1 and 2 may be the latest version of Google Chrome in Microsoft Windows 2006 and Safari 6.1.6 in Mac OS X v. 10.7, respectively. Corresponding, the test codes generated by the code pipeline may contain commands for creating an independent thread for test case 1. Within that thread, the test codes generated by the code pipeline may further contain function calls to appropriate testing grid objects for creating Chrome and Safari web driver objects (or web drivers of appropriate Chrome or Safari capabilities) for running test steps and test data associated with test case 1 via, again, appropriate testing grid function calls. The implementation above applies equally to test threads for other test cases, such as test case 2 and test case N of FIG. 5.

Figure 6:
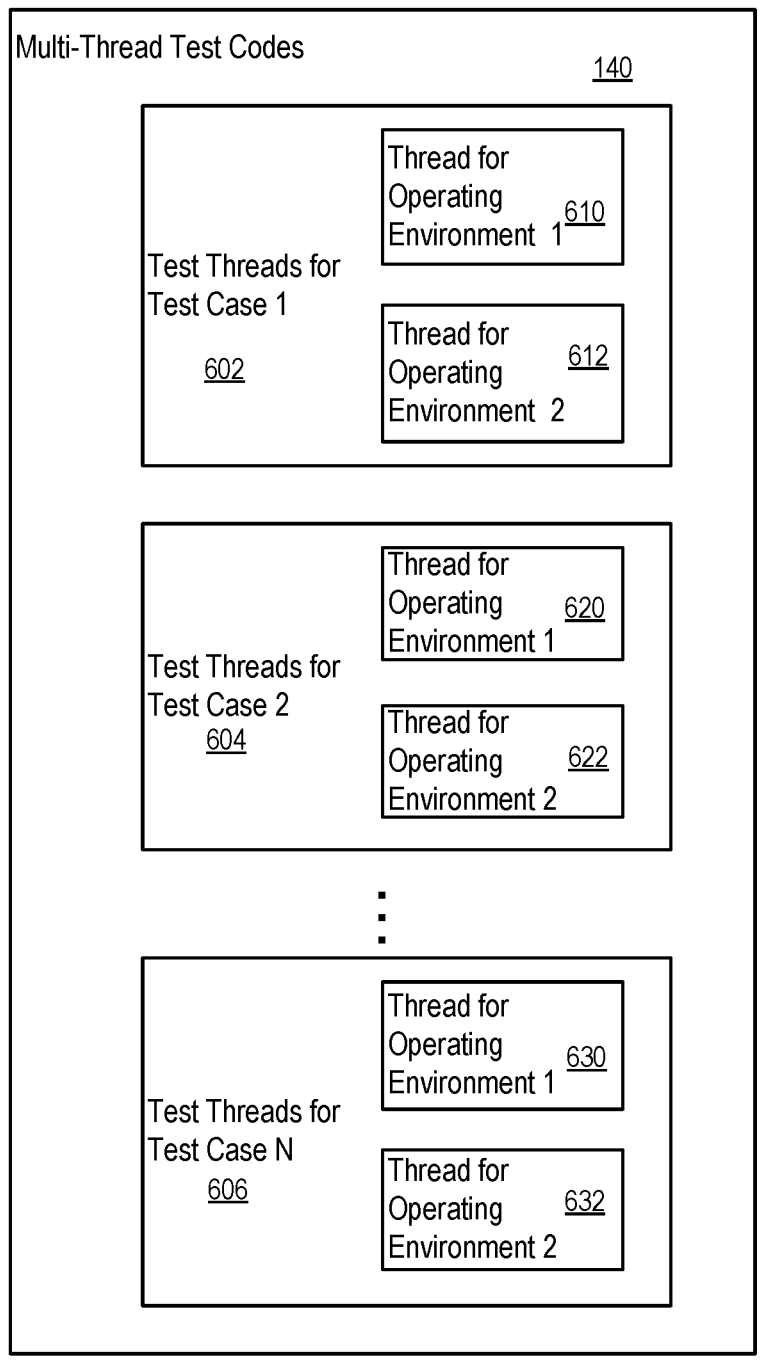
FIG. 6 illustrates an alternative multi-thread implementation of performing multiple test cases in multiple operating environments.

Alternatively, and corresponding to FIG. 6, test codes generated by the code pipeline may be configured to create one test thread for each combination of test case and operating environment. As such, test steps and test data for each test case are in effect copied into the independent test threads for various operating environments. Specifically for a test thread, a testing grid web driver corresponding to an operating environment to be tested is created. Test steps and test data of a test case are run in parallel for various operating environments in the testing grid web drivers created in independent threads.

Figure 7:
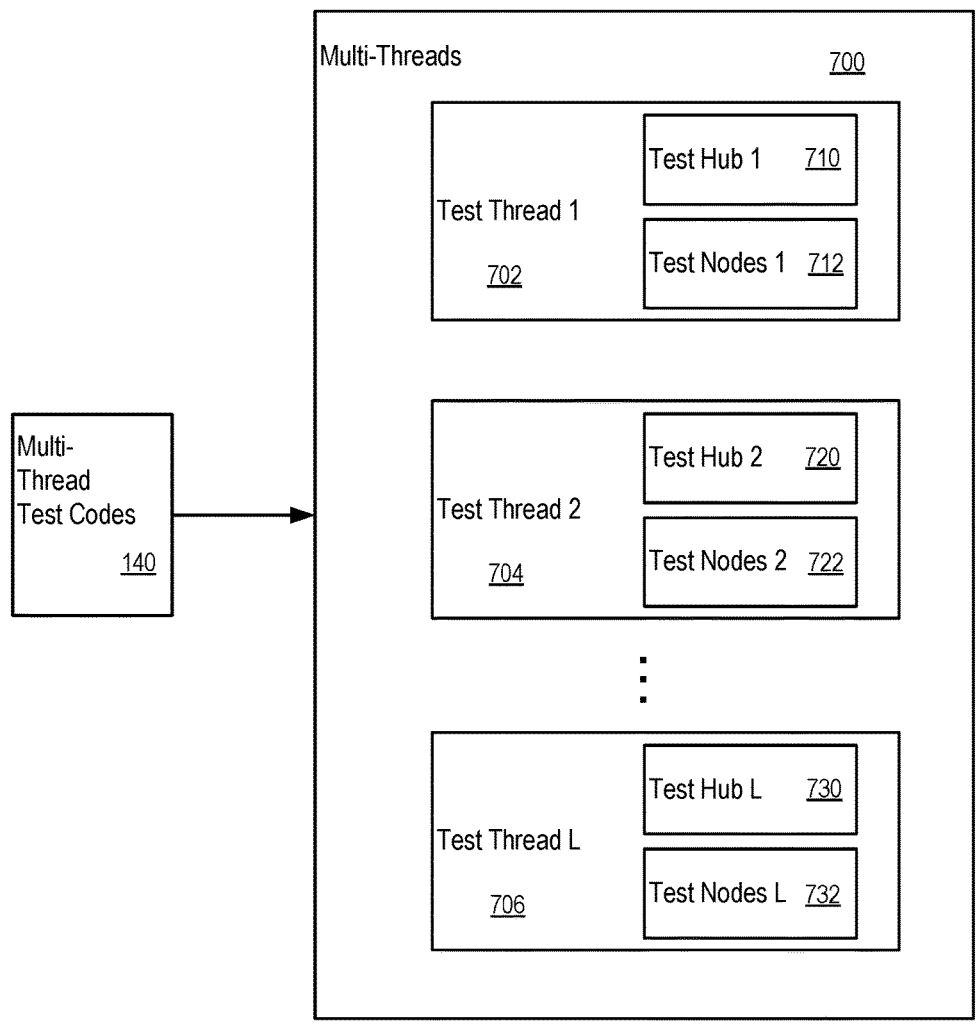
FIG. 7 shows another alternative multi-thread implementation of performing multiple test cases in multiple operating environments.

In another implementation, as shown in FIG. 7, test codes 140 may be generated by the code pipeline for creating 'L' independent test threads such as 702, 704 and 706 each instantiating a testing grid having a test hub and at least one test node. Specifically, test threads 702, 704, and 706 may respectively spawn pairs of test hub and test nodes 710/712, 720/722, and 730/732 for running test steps of the corresponding test cases. For example, each test thread 702, 704, or 706 may correspond to one test case, and as such, various testing grid web drivers may be instantiated for various operating environments by each test thread in corresponding pair of test hub/test nodes. Alternatively, each test thread 702, 704, or 706 may correspond to one combination of test case and test environment, and accordingly, one appropriate testing grid web driver may be instantiated in each pair of test hub and test nodes.

Figure 8:
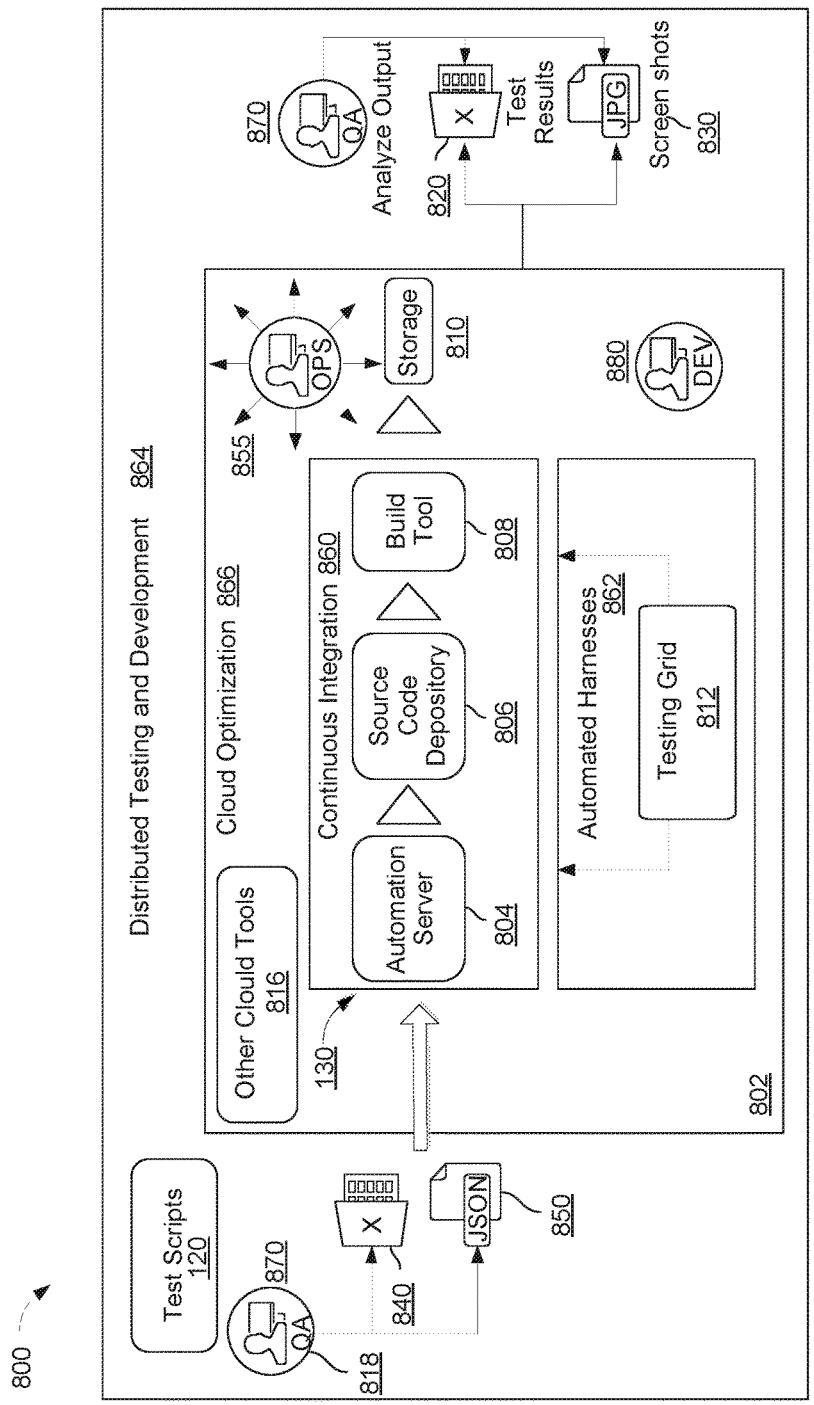
FIG. 8 shows a specific multi-thread implementation of performing multiple test cases in multiple operating environments in a cloud infrastructure.

FIG. 8 illustrates a specific example 800 of the test system 200 of FIG. 2 using CCAT code pipeline and a test harness in the form of a testing grid implemented in virtual and elastic test cloud 802. Test scripts 120 is input into code pipeline 130. As an example, the code pipeline 130 may utilize an automation server 804, a source code depository 806 and a build tool 808 in the cloud for pulling the source code for the CCAT engine from the source code depository, compiling the CCAT source code and transcoding the input test scripts into test codes suitable for testing grid 812 in a continuous integration manner described above. Specifically, the test cloud 802 may be, for example, the Amazon Web Service (AWS); the automation server 804 may provide automation service via Jenkins™; the source code depository 806 may be provided via GitHub™; and the build tool 808 may be provided via Gradle™. The test codes generated by the code pipeline 130 may instantiate multiple test threads containing remote web drivers in testing grid 812, as described above. The testing grid, for example, may be based on Selenium™ grid. Output of the test, including test results for various test cases in various operating environments, may be stored in storage 810 in the cloud, in various formats, such as spreadsheets 820 and screen shot images 830. In implementing the code pipeline 130, the test harness 812, and the storage of test results 810 in the virtual and elastic test cloud 802, other suitable cloud service tools 816 may be involved for enhancing, e.g., elasticity and security. For example, for Amazon web Service, components such as VPC™, EC2™, AMI™, and IAM™ as may be invoked as needed. The cloud and cloud tools may be managed by operation personnel 855.

In the implementation of FIG. 8, development of test scripts and test output analysis may be performed by QA personnel, as shown by 870. Code developer 880 may be involved in building and maintaining core codes, including the CCAT codes and the test codes generated for the testing grid 812.

The implementation of FIG. 8 thus provide a continuous integration of building CCAT code using an automated code pipeline, as indicated by 860. In addition, as indicated by 862, the implementation of FIG. 8 utilize a testing grid such as Selenium™ grid as automated test harnesses. Further, the implementation provides a distributed development and testing of websites, as shown by 864. Finally, the entire code building and testing is implemented in cloud optimized for virtualized testing, as indicated by 866.

Grammatical rules for the test script 120 may be designed to avoid technicalities of writing computer codes. As such, all technicalities may be embedded into the CCAT engine, and a QA personnel 818 of FIG. 8 do not need to possess any specific coding skills. Specifically, test steps and test data for test cases may be specified in a test script descriptor that is easy for humans to read and write. For example, test scripts containing test steps and test data for each of the test cases may be written as a test script descriptor in the form of test spreadsheet 840, or in a light weight data-interchange format 850 such as JSON (Javascript Object Notation). A collection of exemplary test scripts in test spreadsheet format is shown by 1000 of FIG. 9. Each spreadsheet may correspond to, for example, one test case. Each row of a test spreadsheet corresponds to, for example, one entry for a test step containing multiple columns.

Further, meaningful keywords may be developed for test scripts for easy construction of test steps by non-technical tester. In the test scripts shown in FIG. 9, for example, a set of keywords 902 include "openURL", "Wait", "Click", and the like. These keywords may carry literal meanings that are easy to understand by non-technical person without grammatical rigor of various programing components. These keywords, for example, may represent actions in test steps, such as opening a webpage and clicking a button. These keywords may also be used for controlling the timing of the test steps such as waiting for a certain period of time between actions.

A keyword may be further associated with one or more test data or parameters. These parameters may be specified as one or more separate column in the spreadsheet, such as 904 of FIG. 9. For example, the keyword "openURL" may be associates with a test data representing the URL of the webpage to be tested, as shown by 908. For another example, the keyword "wait" may be associated with a number representing the amount of time (e.g., in seconds) to wait between actions, as shown by 910. For yet another example, the keyword "click" may be associates with a parameter indicating the name (or identifier) of the button or other object in the webpage to be clicked, as shown by 912.

An additional column indicating whether a test step in a particular row should be ignored by the code pipeline when building the test codes may be included in a test script spreadsheet, as illustrated by column 906 labeled as "RunMode" column in FIG. 9. The advantage of including this column in the test script spreadsheet is that a test case may be conveniently modified to remove or include certain test steps. If a test step is desired or required, the corresponding row may be flagged with "Yes" under column "RunMode". If a test step becomes unnecessary in further rounds of testing, the RunMode flag of the corresponding row may simply be modified from "Yes" to "No". For example, it may be decided at one point that steps 920 of FIG. 9 tare no longer necessary. Instead of deleting these test steps, a tester may simply modify the RunMode indicators of these steps to "No". If these test steps are ever required again, they RunMode indicators are simply modified back to "Yes".

A test script and test script descriptor described above may contain additional information that may help generating test results. For example, the spreadsheet 1000 for the test script descriptor shown in FIG. 10 contains additional columns such as 1008, 1010, and 1012. These columns may indicate expected output for the test steps. Specifically expected test outputs of test steps for various operating environment, such as FireFox (FF), Chrome, and Internet Explorer (IE), may be separately specified as 1008, 1010, and 1012, as the expected outputs may be different between different operating environments. This information may be useful for the CCAT system to construct more understandable testing results 820 of FIG. 8. For example, the CCAT engine may be configured to compare the returned text from the test to expected text and generates a pass or fail indictor to the tester, rather than returning the actual text generated from the test.

Figure 11:
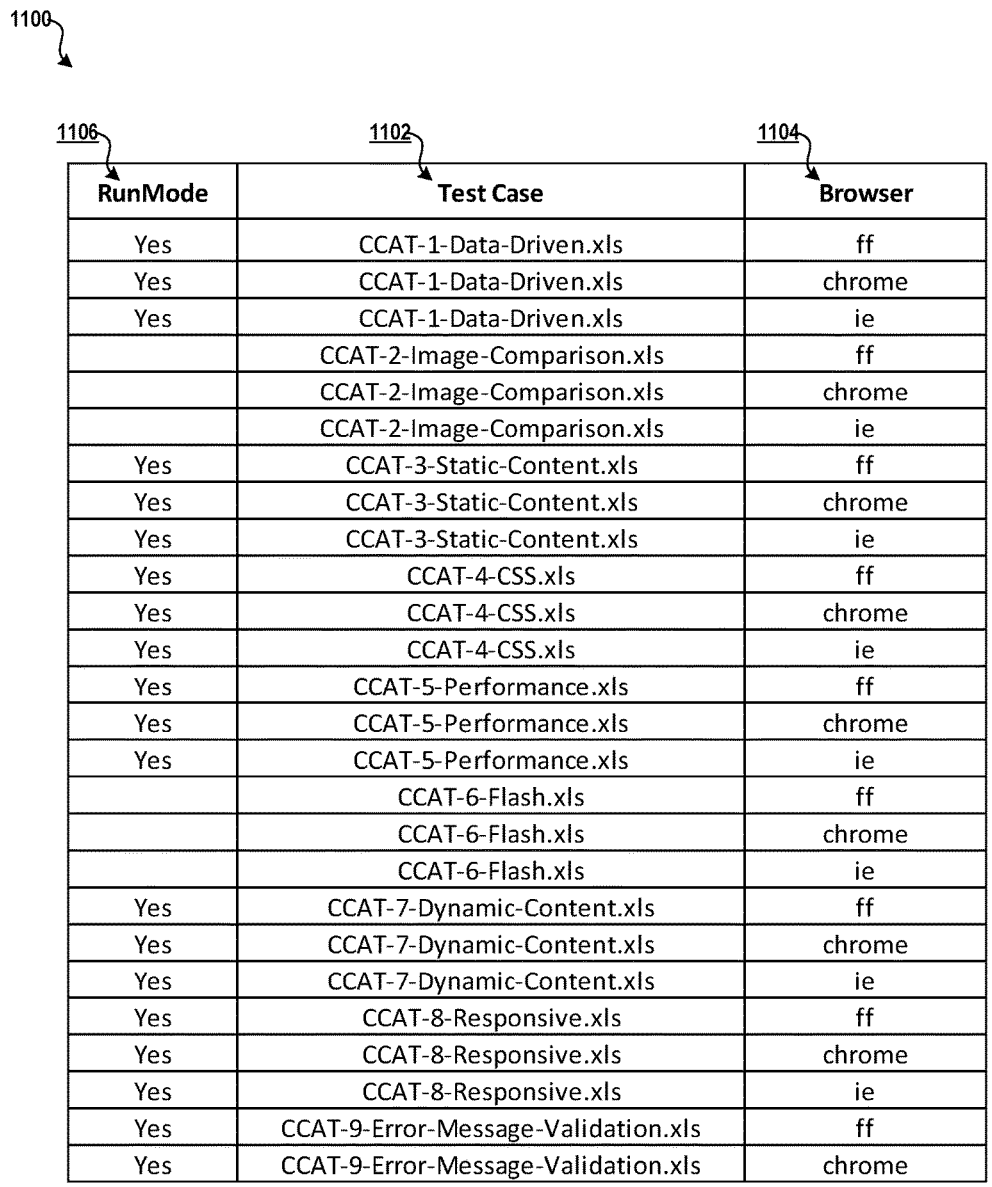
FIG. 11 shows a test master in a spreadsheet format specifying instructions for performing multiple test cases in multiple operating environments.

Multiple test script descriptors, such as test spreadsheets of test scripts may be constructed as described in detail above and each test script descriptor may correspond to one independent test case. One additional test document, referred to as the test master document, may be further constructed by the tester and transcoded by the CCAT code pipeline to specify various operating environments in which each test case is to be performed. An exemplary test master document may be a spreadsheet 1100, as shown in FIG. 11. Each row of the test master spreadsheet 1100 corresponds to a test case and operating environment pair. For example, the column 1102 of the test master spreadsheet 1100 labeled as "Test-Case" specifies the test cases, using, for example, identifiers or file names for test script descriptors such as spreadsheets corresponding to the test cases. In FIG. 11, as an example, nine different test cases are involved.

The "Browser" column 1104 of the test master spreadsheet in FIG. 11 specifies various browsers for testing the test cases. While the example of FIG. 11 only specifies the operating environments by general categories of web browsers to be tested, it is understood that these categories may be refined into levels of smaller granularity. For example, the category of "chrome" may be further refined into chrome of various versions running in various operating systems. Alternatively, these detailed version or operating system information may be specified in additional columns of the spreadsheet of FIG. 11.

The "RunMode" column 1106 of the test master spreadsheet in FIG. 11 specifies whether a specific test case and web browser combination (or test case and operating environment combination) is to be performed. For example, the test master of FIG. 11 specifies that 20 tests are to be performed involving 7 of the 9 test cases, each in all three major web browsers of Firefox, Chrome, and Internet Explorer. The test master spreadsheet of FIG. 11 thus provides a convenient way to specify any test combination.

Figure 12:
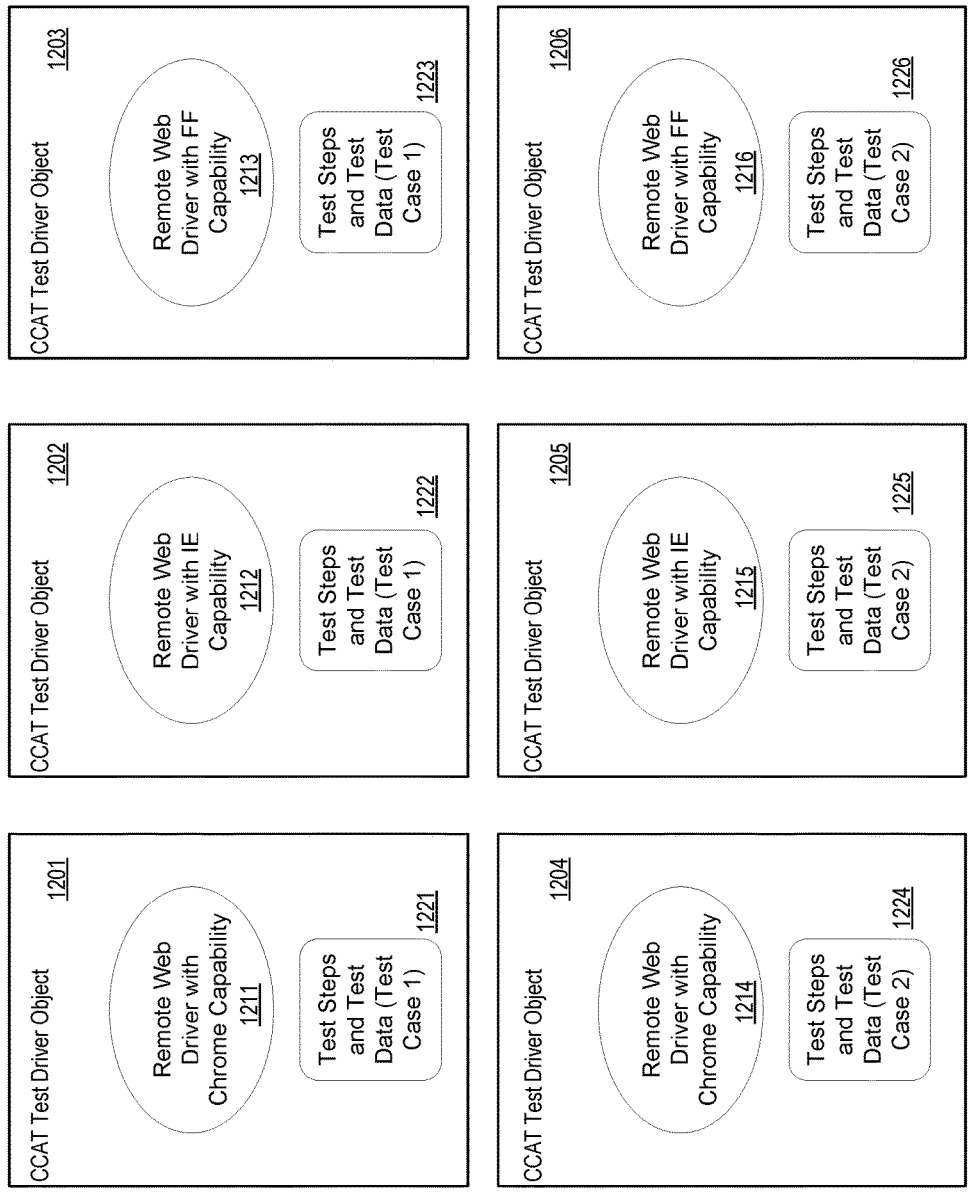
FIG. 12 illustrates running of each combination of test case and operating environment as an independent thread using a cloud connected automated testing system.

The test scripts for the test cases and the operating environments to be tested are collectively referred to as a test suite. The formatted test script descriptors (such as test script spreadsheets, e.g., FIG. 9) and test master document (such as test master spreadsheet of FIG. 11) descripted above are collectively referred to as test descriptors. A test suite, may be input into the code pipeline 130 of FIGS. 1, 2, and 8 for creating multiple test threads as described in FIGS. 5-7, optionally invoking a testing grid and web drivers as described in FIG. 8. FIG. 12 further shows six threads for 2 test cases in three different browsers (Chrome, Internet Explorer, and Firefox) created by the CCAT system in the form of independent CCAT test diver objects, 1201-1206. Each CCAT test driver object further contains a remote web driver (a Selenium web driver object, for example) with appropriate browser capability, as shown by 1211-1216. These remote web drivers do not share resources. Instead, each of the CCAT test diver objects 1201-1206 maintains its autonomy by having its own test steps and test data, as shown by 1221-1226.

Figure 13:
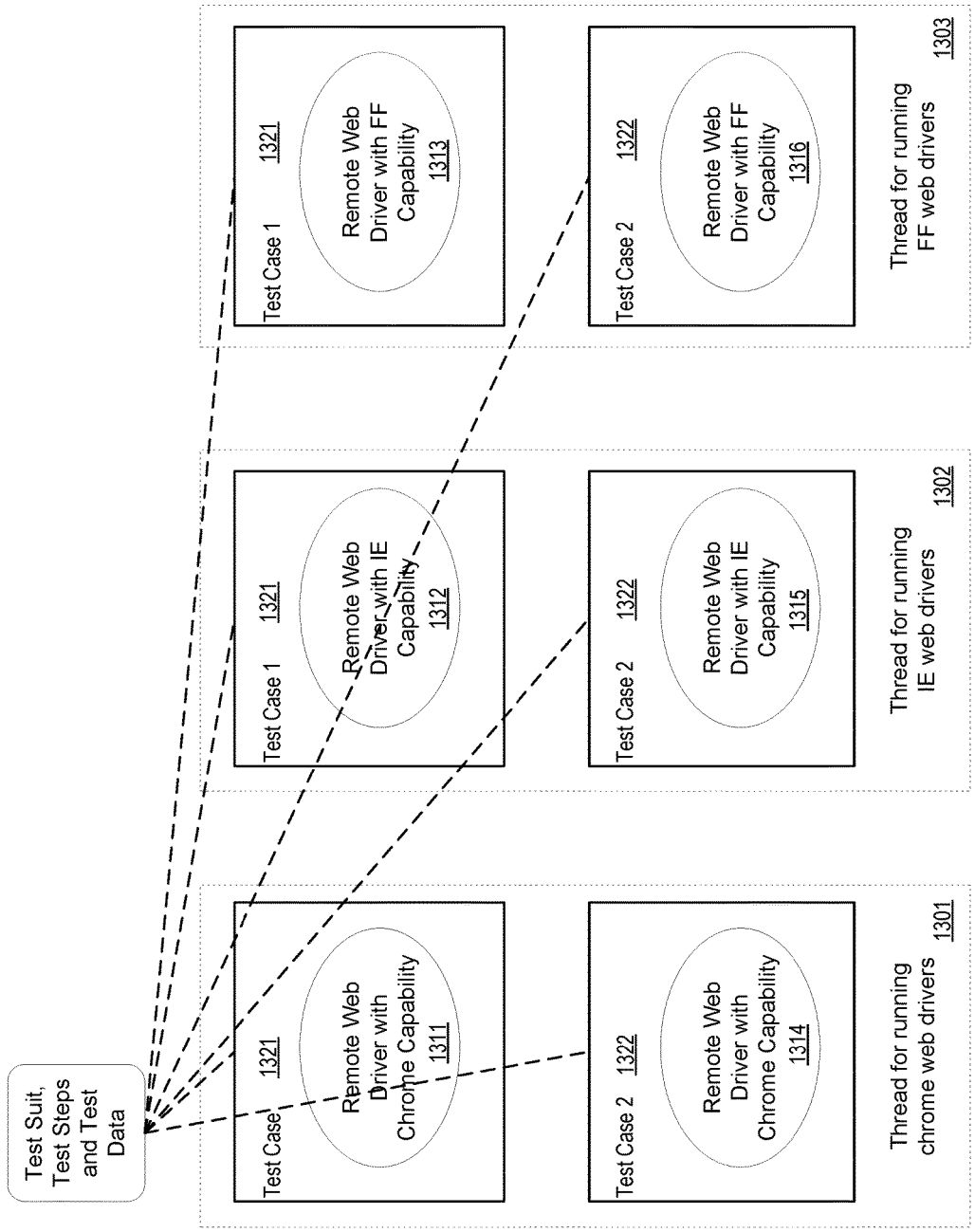
FIG. 13 illustrates an implementation of multi-thread testing having thread overlapping.

In comparison, FIG. 13 shows an alternative implementation for running two test cases 1321-1322 and three different browsers in three threads 1301-1303, each corresponding to one browser capability. For example, different remote web driver objects 1311-1316 in the testing grid may be instantiated with appropriate capabilities. Because of a sharing of common data resources within each thread, there may be thread overlap between the two test cases within each thread, leading to unintended and inadvertent consequences.

Figure 14:
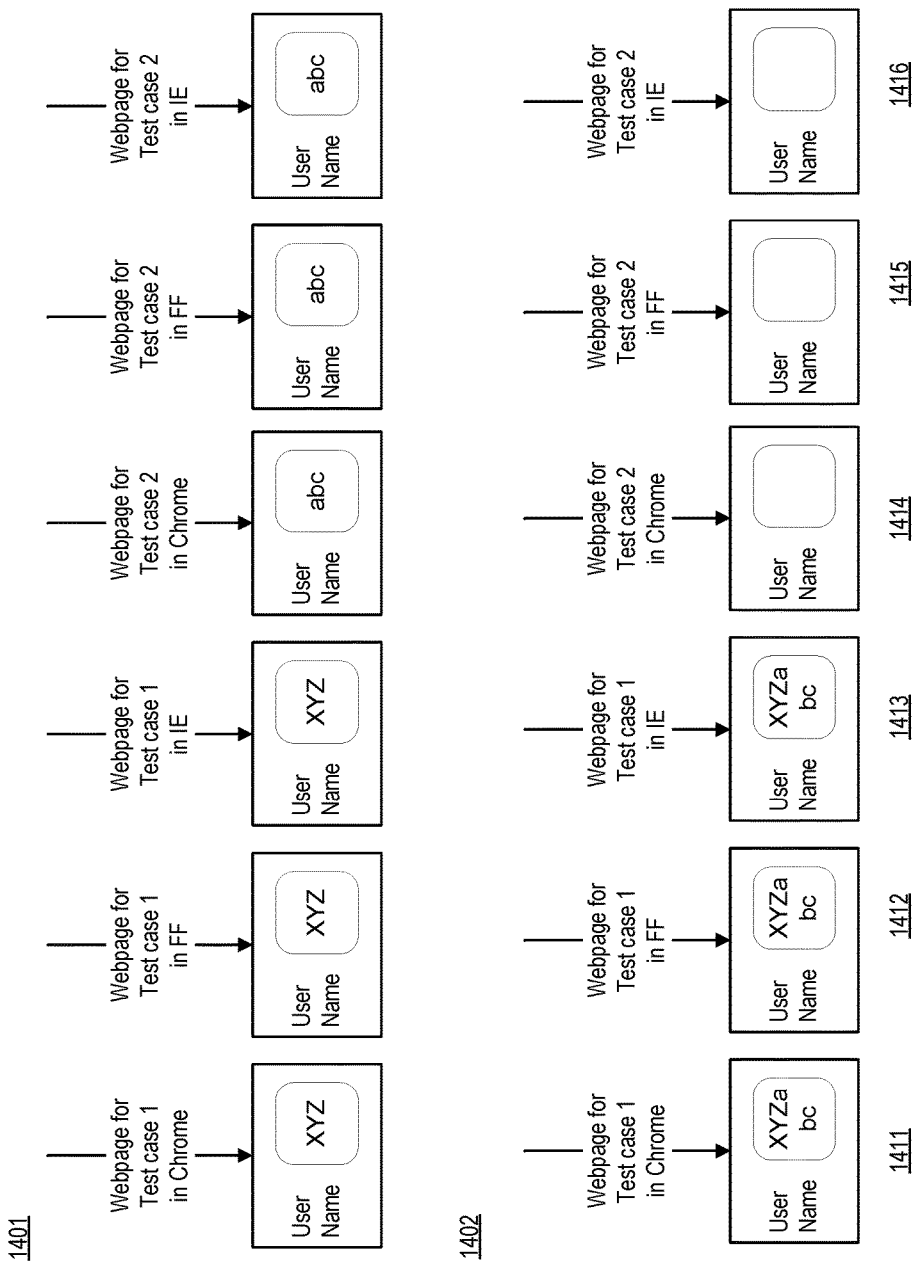
FIG. 14 shows a comparison of an actual testing for two test cases in three operating environments between the implementations of FIG. 12 and FIG. 13, and illustrates an inadvertent effect of thread overlapping in the implementation of FIG. 13.

This may be illustrated in FIG. 14 for running two exemplary test cases. For both test cases, a same webpage is first opened. The webpage contains an input box "User Name". The first test case contains the step of inputting "XYZ" as user name. The second test case contains the step of inputting "abc" as user name. In the 6-thread CCAT test driver object implementation of FIG. 12, remote web drivers of the same browser capability are independently invoked in separate threads and thus each remote web drivers runs one instance of web browser and the user names are correctly input into each web browser, as shown by 1401 of FIG. 14. However, in the 3-thread implementation of FIG. 13, the testing grid may not be able to distinguish between the two test cases due to thread overlapping between 1411 and 1414, 1412 and 1415, 1413 and 1416 of 1402 in FIG. 14. As a result, the user name for test case 1 ("XYZ") and the user name for test case 2 ("abc") may be both inadvertently entered into the same web browser, as shown by 1411-1413 of 1402 in FIG. 14.

Figure 15:
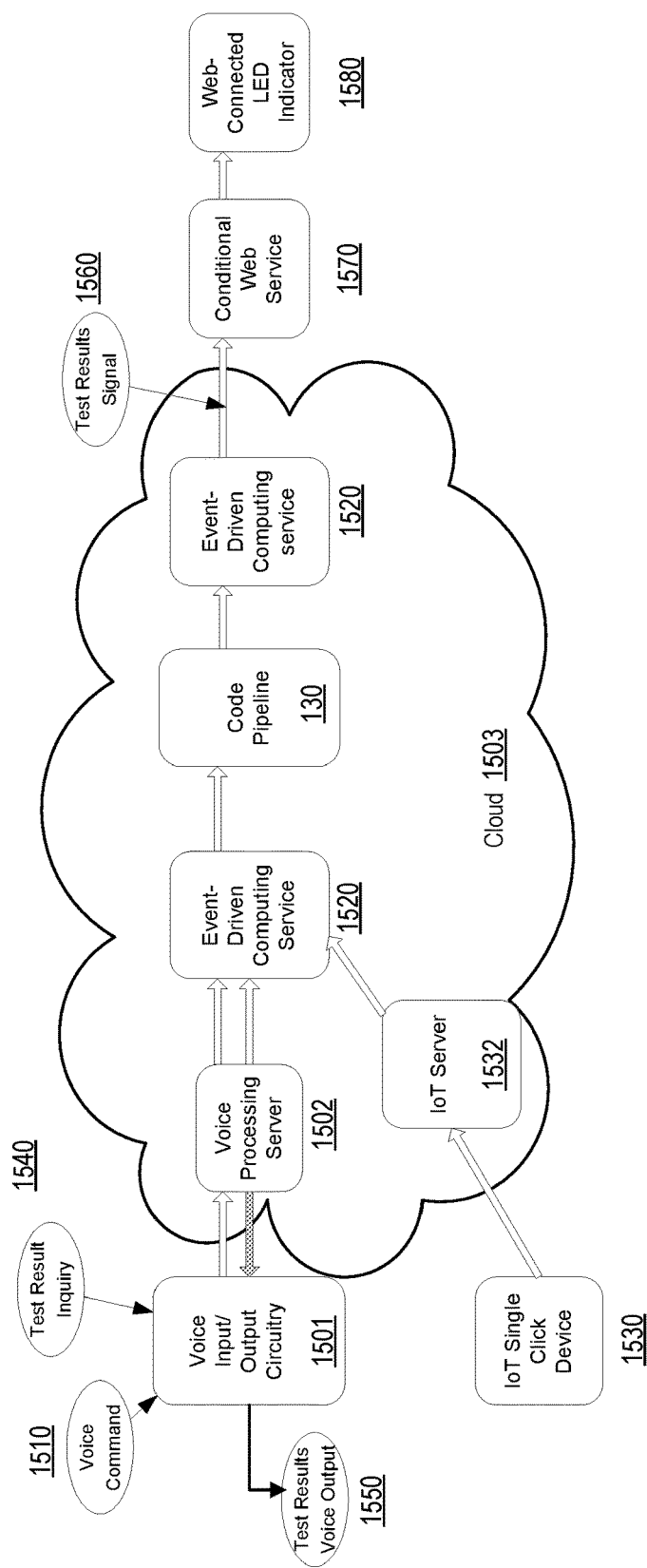
FIG. 15 shows a cloud connected automated testing system implemented in AWS environment that further includes components and interfaces for voice and other remote activation of tests.

FIG. 15 further illustrates using voice command or single-click for activating the multi-thread testing in cloud 1503 as described above. For example, Voice Input/Output Circuitry 1501 in communication with a corresponding Voice Processing Server 1502 may be utilized for inputting voice command 1510 for building and running the multi-thread test codes from the code pipeline 130 via an Event-Driven Computing Server 1520. Alternatively, the building and running of test codes may be activated by an IoT (Internet of Things) Single Click Device 1530 in communication with an IoT Server 1532 and the Event Driven Computing Server 1520. The Voice Processing Server 1502 may be further used for processing a test result inquiry 1540 input from the Voice input/Output Circuitry 1501 and converting test results into voice and uttered by the Voice Input/Output Circuitry 1501 into voice 1550. Alternatively, test results may be converted into predefined signal 1560 for conditional web service such as IFTTT or IF 1570 for triggering a Web-Connected LED Indicator 1580. As an example, the cloud may be the Amazon Web Service (AWS); the Voice Input/Output Circuits 1501 may be an Amazon Echo device; the Voice Processing Server 1502 may be the Amazon Alexa server; the IoT Single Click Device 1530 may be an AWS IoT single click device; the IoT Server 1532 maybe the AWS IoT server; and the Web-Connected LED Indicator 1580 may be Phillips hue lines of smart LEDs.

Using the implementation of FIG. 15 and its variations, test cases may be designed and stored in the cloud as a test depository. Cloud services such as event-driven computing services, conditional web services, cloud code pipeline services, and cloud storages are integrally invoked for comprehensive and efficient testing of applications. Specifically, integration of voice-activation or IoT-driven interfaces to initiate an automatic process of code build, multi-thread execution of a group of tests in multiple operational environments, test result processing, and test result feedback via voice and/or visual indicators offers non-technical QA personnel a convenient platform for conducting distributed and automated tests in any combination and from anywhere.

Various implementations have been specifically described above. However, many other implementations are also possible. Further, the described methods, devices, processing, frameworks, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and controlled, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

The principles described herein may be embodied in many different forms. Not all of the depicted components may be required, however, and some implementations may include additional components. Variations in the arrangement and type of the components may be made without departing from the spirit or scope of the claims as set forth herein. Additional, different or fewer components may be provided.

What is claimed is:

1. A method comprising:
receiving a keyword based test suite descriptor for a set of independent test cases for an application with a first flag field;
selecting a subset of independent test cases from the set of independent test cases based on the first flag field;
identifying keyword based test scripts specifying test steps for the subset of independent test cases linked from the test suite descriptor; wherein at least some of the test steps comprise corresponding data entries specifying a respective subset of test data for a respective test step;
selecting subsets of test steps to be performed based on a second flag field in the keyword based test scripts, each subset of test steps corresponding to one of the subset of independent test cases;
identifying multiple different operating environments for the application according to the test suite descriptor;
compiling a source code to obtain a code engine for generating test codes;
for each combination of one of the subset of independent test cases in one of the multiple different operating environments and in response to receiving a command to initiate a test for the application:
generating a test code from the subset of test steps corresponding to the one of the subset of independent test cases using the code engine;
instantiating an independent test thread comprising a remote test driver and a thread-specific test dataset by executing the test code; and
copying test data specified in the data entries for the one of the subset of independent test cases into the remote test driver to create a thread-specific test dataset for the independent test thread; and
executing the subset of independent test cases against each of the multiple different operating environments independently by running the independent test threads based on the thread-specific test datasets and the remote test drivers.

2. The method of claim 1, where the application is a website and the keyword based test suite descriptor comprises a spreadsheet having a set of data items where each data item is associated with one of the set of independent test cases.

3. The method of claim 2, where the keyword based test scripts comprise spreadsheets.

4. The method of claim 3, where the test scripts comprises predefined keywords specifying a test actions.

5. The method of claim 3, where the data entries further comprise a respective data field specifying an expected test output.

6. The method of claim 2, where an operating environment of the multiple different operating environments comprises at least a combination of an operating system and a type of web browser.

7. The method of claim 2, where each remote test driver comprises an independent testing grid web driver in a pre-determined testing grid platform.

8. A cloud-based platform, comprising:
a communication interface;
a memory; and
circuitry in communication with the memory and the communication interface, the circuitry configured to:
receive, via the communication interface, a keyword based test suite descriptor for a set of independent test cases for an application with a first flag field;
select a subset of independent test cases from the set of independent test cases based on the first flag field;
identify keyword based test scripts specifying test steps for the subset of independent test cases linked from the test suite descriptor; wherein at least some of the test steps comprise corresponding data entries specifying a respective subset of test data for a respective test step;
select subsets of test steps to be performed based on a second flag field in the keyword based test scripts, each subset of test steps corresponding to one of the subset of independent test cases;
identify multiple different operating environments for the application according to the test suite descriptor;
compile a source code to obtain a code engine for generating test codes;
for each combination of one of the subset of independent test cases in one of the multiple different operating environments and in response to receiving a command to initiate a test for the application,
generate a test code from the subset of test steps corresponding to the one of the subset of independent test cases using the code engine;
instantiate an independent test thread comprising a remote test driver and a thread-specific test dataset by executing the test code; and
copy test data specified in the data entries for the one of the subset of independent test cases into the remote test driver to create a thread-specific test dataset for the independent test thread; and
execute the subtest of independent test cases against each of the multiple different operating environments independently by running the independent test threads based on the thread-specific test datasets and the remote test drivers.

9. The cloud-based platform of claim 8, where the application is website and the keyword based test suite descriptor comprises a spreadsheet having a set of data items where each data item is associated with one of the set of independent test cases.

10. The cloud-based platform of claim 9, where the keyword based test scripts comprises spreadsheets.

11. The cloud-based platform of claim 10 where the test scripts comprise predefined keywords specifying test actions.

12. The cloud-based platform of claim 10, where the data entries further comprise a respective data field specifying an expected test output.

13. The cloud-based platform of claim 9, where an operating enviornment of the multiple different operating environments comprises at least a combination of an operating system and a type of web browser.

14. A method comprising:
predefining a set of keywords each corresponding to a test action among a set of test actions for testing a website;
receiving a test suite comprising a test master document containing a test suite descriptor for configuring a set of independent test cases for the website and multiple test script descriptors each for one of the set of independent test cases, where each test script descriptor comprises multiple keywords of the set of keywords arranged according to predefined grammatical rules;

selecting a subset of independent test cases from the set of independent test cases based on a first flag field in the test master document;

identifying test data for the subset of independent test cases from the the test master document;

selecting subsets of test steps to be performed for the subset of independent test cases according to a second flag field in the test script descriptors;

identifying multiple different operating environments for browsing the website based on the test master document where each operating environment comprising at least a type of web browser;

compiling a source code to obtain a test code generating engine;

for each combination of one of the subset of independent test cases in one of the multiple different operating environments and in response to receiving a command to initiate a test for the website,
- generating a test code from the subset of test steps corresponding to the one of the subset of independent test cases using the test code generating engine;
- instantiating an independent test thread comprising a remote test driver and a thread-specific test dataset by executing the test code; and
- copying the test data corresponding to the one of the subset of independent test cases into the remote test driver to create a thread-specific test dataset for the independent test thread; and executing the subset of independent test cases against each of the multiple different operating environments independently by running the independent test threads based on the thread-specific test datasets and the remote test drivers.

* * * * *